Patented Dec. 15, 1936

2,064,297

UNITED STATES PATENT OFFICE 2,064,297

HYDROXY ALKOXY DERIVATIVES OF 2-PHENYLQUINOLINE-4-CARBOXYLIC ACID AND METHOD OF MAKING SAME

Paul Diedrich, Finkenkrug, Germany, assignor to Schering-Kahlbaum A. G., Berlin, Germany No Drawing. Application February 20, 1934, Serial No. 712,254. In Germany February 22, 1933

11 Claims. (Cl. 260—39)

This invention relates to derivatives of 2-phenylquinoline-4-carboxylic acid and more particularly to hydroxyalkyl hydroxy derivatives of the latter and methods of making same.

Hydroxy compounds of the 2-phenylquinoline-4-carboxylic acid are already known. The comparative pharmacological investigation of these compounds, however, shows that they possess the same toxicity to animals as the 2-phenylquinoline-4-carboxylic acid itself. The same applies to the alkylated hydroxy compounds of said acid which do not differ in this respect from the non-alkylated hydroxy compounds nor from the 2-phenylquinoline-4-carboxylic acid.

One object of this invention is to provide derivatives of hydroxy-2-phenylquinoline-4-carboxylic acids which show considerably less toxicity than the hydroxy acids themselves but about the same therapeutical efficiency. It has been found that the hydroxyalkylated derivatives of said hydroxy-2-phenylquinoline-4-carboxylic acids possess these valuable properties.

Another object of this invention consists in producing said hydroxyalkylated hydroxy derivatives of said phenylquinoline-4-carboxylic acid. For this purpose hydroxy-alkyl hydroxyacetophenones are condensed in a known manner with isatine or hydroxyalkyl hydroxyanilines are reacted with benzaldehyde and pyroracemic acid.

Example 1

2-(4'-hydroxyethoxy phenyl) quinoline-4-carboxylic acid.

14.7 grams of isatine, 20 grams of 4-hydroxyethoxy acetophenone (obtained by reacting ethylene chlorohydrine with the sodium compound of 4-hydroxy acetophenone), 85 ccs. of absolute alcohol and 42 ccs. of 33% potassium hydroxide solution are boiled under reflux for 6 to 8 hours. After distilling off the alcohol, the residual solution is diluted with water and is extracted with ether in order to remove neutral impurities and not-reacted hydroxyethyl hydroxyacetophenone. On acidifying the aqueous solution, after freeing the latter of the ether, a light-brown precipitate is obtained. The latter is purified by dissolving the same in dilute sodium carbonate solution, filtering and reprecipitating the product in the form of light-yellow needles by adding dilute hydrochloric acid to said filtrate. The pure 2-(4'hydroxyethoxy phenol) quinoline-4-carboxylic acid has a melting point of 241° C. The yield is about 25 grams.

Example 2

2-(2'-hydroxyethoxy phenyl) quinoline-4-carboxylic acid.

14.7 grams of isatine, 20 grams of 2-hydroxyethoxy acetophenone (obtained from ethylene chlorohydrine and the sodium compound of 2-hydroxy acetophenone), 85 ccs. of water and 42 ccs. of 33% potassium hydroxide solution are boiled for 8 hours. The reaction mixture is worked up according to Example 1 and yields 27 grams of 2-(2'-hydroxyethoxy phenyl) quinoline-4-carboxylic acid with a melting point of 139° C. after recrystallization from alcohol.

Example 3

2-(2'-α-glycerido phenyl)-quinoline-4-carboxylic acid.

12 grams of isatine, 20 grams of 2-α-glycerido acetophenone (obtained from the sodium compound of o-hydroxy acetophenone and α-chlorohydrine), 70 ccs. of alcohol and 34 ccs. of 33% potassium hydroxide solution are heated to the boiling point for 6 hours. The solution is worked up according to Example 1. The precipitated phenylquinoline carboxylic acid derivative contains after recrystallization from water or alcohol 1 mol. of water of crystallization. If dried at 100°, the acid has a melting point of 130° C.

Example 4

2-phenyl-6-hydroxyethoxy quinoline-4-carboxylic acid.

24 grams of the hydroxyethylether of p-aminophonol are boiled in 150 ccs. of alcohol with 16 grams of benzaldehyde for 30 minutes whereafter 13 grams of pyroracemic acid are added drop by drop while keeping the temperature at the boiling point. After 2 hours the alcohol is distilled off, the residue is extracted with aqueous sodium carbonate solution and the extract is filtered. The filtrate is acidified by means of acetic acid and the precipitate is recrystallized from a small amount of alcohol. The acid obtained forms an amorphous, light-brown, tasteless powder of the melting point 198° C.

Example 5

2-phenyl-8-hydroxyethoxy quinoline-4-carboxylic acid.

24 grams of the hydroxyethyl ether of o-aminophenol, 150 ccs. of alcohol and 16 grams of benzaldehyde are boiled for 30 minutes. To this solution 13 grams of pyroracemic acid are added drop by drop and the reaction mixture is kept boiling for 2 hours, whereafter it is worked up according to Example 4. The 2-phenyl-8-hydroxy ethoxy quinoline-4-carboxylic acid forms on recrystallization from dilute alcohol a yellow crystal powder of the melting point of 190° C.

Example 6

2-(2'-hydroxy ethoxy-5'-methyl phenyl)-quinoline-4-carboxylic acid.

14.7 grams of isatine, 22 grams of 2-hydroxy-ethoxy-5-methyl acetophenone of the boiling point 208-210° C. (20 mm.) (obtained by the action of ethylene oxide upon 2-hydroxy-5-methyl acetophenone), 42 ccs. of 33% potassium hydroxide solution and 85 ccs. of alcohol are heated for 6 hours at the boiling point. The residue obtained after distilling off the alcohol is diluted with water, extracted with ether, and the remaining aqueous solution is precipitated by acetic acid. The precipitate is dissolved in sodium carbonate solution, boiled with animal charcoal and again precipitated by the addition of acetic acid. The 2-(2'-hydroxy ethoxy-5'-methyl phenyl-quinoline-4-carboxylic acid is obtained as a light-yellow powder which after drying in a desiccator over concentrated sulfuric acid melts at 133° C. The acid is soluble in alcohol, insoluble in water, chloroform and benzene. The yield amounts to about 26 grams.

Example 7

2-(2'-hydroxy ethoxy-4'-methyl phenyl)-quinoline-4-carboxylic acid.

14.7 grams of isatine, 22 grams of 2-hydroxy ethoxy-4-methyl acetophenone of the B. P.$_{23}$= 209-211° C. (obtained by the action of ethylene oxide on 2-hydroxy-4-methyl acetophenone), 42 ccs. of 33% potassium hydroxide solution and 85 ccs. of alcohol are heated under reflux for 6 hours to the boiling point. The reaction mixture is worked up as described in Example 6. The obtained 2-(2'-hydroxy ethoxy-4-methyl phenyl)-quinoline-4-carboxylic acid forms a light-brown powder of bitter taste. On recrystallization from 50% alcohol, microscopic needles of the melting point 216° C. are obtained. The yield amounts to 24 grams.

Analogous compounds may be obtained as described. The invention, however, is not limited to the examples given; for, various changes may be made in accordance with the principles and the claims annexed hereto.

What I claim is:—

1. Hydroxy alkoxy derivatives of the 2-phenyl quinoline-4-carboxylic acid, said derivatives, exhibiting considerably less toxicity than the hydroxy-2-phenyl quinoline-4-carboxylic acids themselves, but being of about the same therapeutical value as the latter, and representing crystalline light-yellow to light-brown powders which are soluble in water and alcohol.

2. 2-(hydroxy ethoxy phenyl) quinoline-4-carboxylic acids, exhibiting considerably less toxicity than the hydroxy-2-phenyl quinoline-4-carboxylic acids themselves, but being of about the same therapeutical value as the latter, and representing crystalline light-yellow to light-brown powders which are soluble in water and alcohol.

3. Hydroxy ethoxy-2-phenyl quinoline-4-carboxylic acids, exhibiting considerably less toxicity than the hydroxy-2-phenyl quinoline-4-carboxylic acids themselves, but being of about the same therapeutical value as the latter, and representing crystalline light-yellow to light-brown powders which are soluble in water and alcohol.

4. 2-(hydroxy alkoxy alkyl phenyl) quinoline-4-carboxylic acids, exhibiting considerably less toxicity than the hydroxy-2-phenyl quinoline-4-carboxylic acids themselves, but being of about the same therapeutical value as the latter, and representing crystalline light-yellow to light-brown powders which are soluble in water and alcohol.

5. A method of producing hydroxy alkoxy derivatives of 2-phenyl quinoline-4-carboxylic acid which comprises heating in the presence of alkali a hydroxy alkoxy acetophenone compound with isatine and isolating the reaction product.

6. A method of producing hydroxy alkoxy derivatives of 2-phenyl quinoline-4-carboxylic acid which comprises heating in the presence of alkali a hydroxy alkoxy acetophenone compound with isatine in alkali metal hydroxide solution and isolating the reaction product.

7. A method of producing hydroxy alkoxy derivatives of 2-phenyl quinoline-4-carboxylic acid which comprises heating in the presence of alkali a hydroxy alkoxy acetophenone compound with isatine in alkali metal hydroxide solution in the presence of alcohol and isolating the reaction product.

8. A method of producing hydroxy alkoxy derivatives of 2-phenyl-quinoline-4-carboxylic acid which comprises heating a hydroxy alkoxy acetophenone compound with isatine in alkali metal hydroxide solution in the presence of alcohol and isolating the reaction product.

9. A method of producing hydroxy alkoxy derivatives of 2-phenyl quinoline-4-carboxylic acid which comprises heating a mixture of isatine, a hydroxy alkoxy acetophenone compound, alkali metal hydroxide solution and alcohol for several hours to the boiling point, distilling off the alcohol, removing the neutral impurities and unreacted hydroxy alkoxy acetophenone compound by extracting with non-water-miscible solvents, acidifying the remaining alkaline solution and purifying the obtained product.

10. A method of producing hydroxy alkoxy derivatives of 2-phenylquinoline-4-carboxylic acids, which comprises reacting a chlorohydrine with an alkali metal compound of a hydroxy acetophenone compound to form a hydroxy alkoxy acetophenone, and heating said reaction product in the presence of alkali with isatine and isolating the condensation product.

11. A method of producing hydroxy alkoxy derivatives of 2-phenylquinoline-4-carboxylic acids, which comprises reacting an alkylene oxide with a hydroxy acetophenone compound to form a hydroxy alkoxy acetophenone, and heating said reaction product in the presence of alkali with isotine and isolating the condensation product.

PAUL DIEDRICH.